United States Patent [19]

Barenberg

[11] 4,429,067

[45] Jan. 31, 1984

[54] POLYETHYLENE TEREPHTHALATE MOLDING COMPOSITIONS

[75] Inventor: Sumner A. Barenberg, Hockessin, Del.

[73] Assignee: E. I. Du Pont de Nemours and Company, Wilmington, Del.

[21] Appl. No.: 437,752

[22] Filed: Oct. 27, 1982

[51] Int. Cl.³ .................. C08L 67/00; C08K 5/10
[52] U.S. Cl. .................. 524/299; 260/DIG. 35;
524/394; 524/601; 524/604; 524/605
[58] Field of Search ............ 524/299, 394, 601, 604,
524/605; 260/DIG. 35

[56] References Cited

U.S. PATENT DOCUMENTS

| 4,098,750 | 7/1978 | Mark et al. | 524/299 |
| 4,100,325 | 7/1978 | Summers et al. | 524/299 |

FOREIGN PATENT DOCUMENTS

| 55-133444 | 10/1980 | Japan | 524/299 |
| 2015014 | 9/1979 | United Kingdom . | |

*Primary Examiner*—Ronald W. Griffin

[57] ABSTRACT

Use of a selected benzoate oligomer has been found to reduce mold deposits and to lower volatility without impairing crystallization rates of polyethylene terephthalate molding blends which contain an ionic hydrocarbon copolymer or ionic salt of a hydrocarbon acid, over polyethylene terephthalate blends which contained the ionic component and other additives.

12 Claims, No Drawings

POLYETHYLENE TEREPHTHALATE MOLDING COMPOSITIONS

FIELD OF THE INVENTION

This invention relates to polyethylene terephthalate compositions.

BACKGROUND OF THE INVENTION

Historically, polyethylene terephthalate has been difficult to mold at molding temperatures below about 110° C. because its crystallization rate is so slow and uneven that warped articles are obtained. Moreover the articles tend to stick to the mold and are difficult to remove. Recently, it has been found that polyethylene terephthalate articles of good quality can be obtained by molding at lower temperatures, e.g., 80°–100° C., if certain materials are added to the resin prior to molding. These additive materials increase the rate of crystallization, and molded articles having smooth glossy surfaces that are easily removable from molds, are obtained when the materials are employed. The additive materials are: (1) sodium or potassium salts of a selected hydrocarbon acid, or sodium or potassium salts of selected organic polymers containing pendant carboxyl groups and (2) selected low molecular weight organic compounds that are esters, ketones, sulfones, sulfoxides, nitriles or amides.

However, many of these low molecular weight organic compounds are somewhat volatile at temperatures of 80° C. or above, and tend to vaporize and redeposit on the mold surfaces. It would be advantageous to find low molecular weight organic compounds that do not vaporize and redeposit. Moreover, when the low molecular weight organic compound is an ester, many of the esters undergo a reaction called "ester-interchange" with the PET. In the other words, the low molecular weight R and R¹ groups in the ester

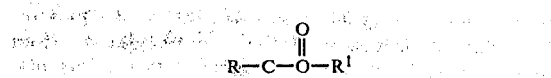

will react with a long chain group in polyethylene terephthalate (PET) by breaking a bond at a

grouping, thus replacing a long chain with a short R— group. The interchange can be depicted as follows:

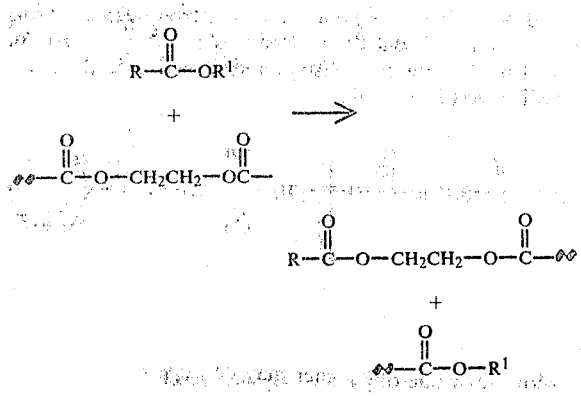

(R and R¹=low mol wt. alkyl), thus the net result is to shorten the overall average chain length of the PET in the mixture. This is detrimental and causes a lowering of the strength of plastic articles molded from PET resins.

Hindered low molecular weight esters will not undergo ester interchange. It is difficult for the

bond in hindered esters to break because of its protected nature. For example, a hindered ester such as

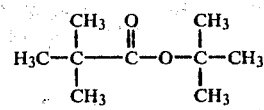

will not undergo ester interchange to any significant extent. However, such esters, because of their rather symetrical shape due to their "hindered" nature, are more volatile than their straight chain ester counterparts and are subject to the volatility deficiencies described above.

It would be beneficial to find an ester that exhibited low volatility while at the same time did not tend to undergo ester interchange when present with polyethylene terephthalate in a molding system.

SUMMARY OF THE INVENTION

It has now been found that certain benzoate oligomers are effective to provide thermal stability, melt stability, and rapid crystallization to polyethylene terephthalate molding resins, while being relatively nonvolatile. The benzoate oligomers can be employed as the low molecular weight organic compound in the system described further above. The benzoate oligomers have the formula

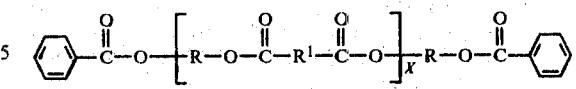

wherein R is selected from the class consisting of

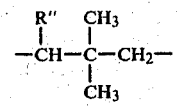

wherein R" is H— or alkyl of 1–3 carbon atoms or

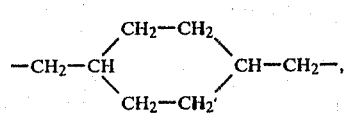

R¹ is selected from the class consisting of alkylene of 2–6 carbon atoms, or arylene, or alicyclic alkylene of 6–8 carbon atoms, and X is a cardinal number of between 1 and 50.

One class of preferred polyethylene terephthalate compositions of this invention are dry blends of (a) 20–90% by weight of components (a), (b) and (c) of at least one polyethylene terephthalate having an inherent viscosity of at least 0.4 dl/g, (b) 1–10% by weight of components (a), (b) and (c) of at least one sodium or potassium salt of a hydrocarbon carboxylic acid of 7–25 carbon atoms or at least one sodium or potassium salt of an ionic hydrocarbon copolymer of an α-olefin of 2–5 carbon atoms and an α,β-ethylenically unsaturated carboxylic acid of 3–5 carbon atoms in which the carboxyl groups have been at least partially neutralized with Na+ or K+ cations, provided the amount present is sufficient to provide a $\Delta H_H/\Delta H_c$ ratio (defined further below) of less than 0.25 to a blend of (a) and (b), (c) 0.1–10% by weight of components (a), (b) and (c) of at least one benzoate oligomer of the formula

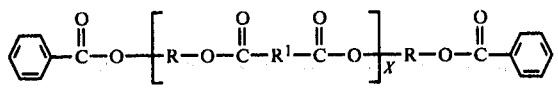

wherein
R is selected from the class consisting of

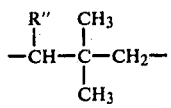

wherein R" is H— or alkyl of 1–3 carbon atoms or

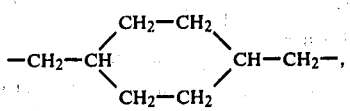

$R^1$ is selected from the class consisting of alkylene of 2–6 carbon atoms, arylene of 2–6 carbon atoms, alicyclic alkylene of 6–8 carbon atom, and X is a cardinal number of between 1 and 50, provided the amount present is sufficient to lower the TpK (defined further below) of a blend of (a) and (b) at least about 4° C.

Another class of preferred polyethylene terephthalate compositions of this invention are melt blends made from the dry blends described above.

Component (c) in the above compositions has been found to exhibit: (1) low volatility at high processing temperatures, and to (2) lower the cold crystallization exotherm of PET, thus allowing for lower mold temperatures, (3) cause no significant loss of mechanical properties in the blend, (4) provide substantially no ester interchange and (5) impart good thermal stability to the blends.

The Polyethylene Terephthalate

The polyethylene terephthalates employed herein are of high molecular weight, having an inherent viscosity of at least 0.4 dl/g as measured by ASTM D-2857. The polyethylene terephthalates preferably have an upper limit on inherent viscosity of about 1.2. Inherent viscosity is measured in a 3:1 by volume ratio of methylene chloride and trifluoroacetic acid at 30° C. The polyethylene terephthalates can contain up to 50% by weight of other comonomers such as diethylene glycol, glutaric acid, polybutylene terephthalate, polyalkylene oxide, cyclohexane dimethanol, and other diols. Preferably the polyethylene terephthalate is present in an amount between 35 and 70% by weight of blend. More than one polyethylene terephthalate may be used.

The Sodium or Potassium Salt of a Hydrocarbon Caboxylic Acid or an Ionic Hydrocarbon Copolymer Representative acids for the sodium or potassium salts of hydrocarbon carboxylic acids are stearic, pelargonic and behenic acids. Representatives of the ionic hydrocarbon copolymers are the salts of copolymers of olefins and acrylic or methacrylic acids, or copolymers of aromatic olefins and maleic anhydride. Preferably these materials include the sodium or potassium salt of stearic acid; the sodium or potassium salt of ethylene/methacrylic acid copolymers (including both wholly or partially neutralized salts e.g., at least about 30% neutralized), the sodium salt of styrene/maleic anhydride copolymers (including both wholly or partially neutralized salts e.g., at least about 30% neutralized) and sodium versatate. In the copolymers listed above the olefin or aromatic olefin moiety ordinarily comprises 50–98 percent by weight of the copolymer, and preferably 80–98 percent. An especially preferred material is the sodium salt of ethylene/methacrylic acid copolymer. The copolymers may be prepared by conventional high pressure polymerization technology. The salts will generally be present in an amount of 1–10%, preferably 2–6%, by weight components (a), (b) and (c). More than one salt may be present.

The Benzoate Oligomers

The benzoate oligomers described above are preferably present in an amount of 2–6% by weight based on components (a), (b) and (c). Preferably, in the formula of the oligomers provided in the summary section further above, X will be a cardinal number of between 1 and 10. Preferably also R" will be H or (CH3)2—CH—, R will be

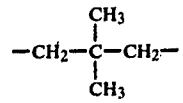

and $R^1$ will be alkylene of 2–6 carbon atoms. Most preferably $R^1$ will be butylene, i.e., —CH2—4, and X will be 2. Thus the most preferred benzoate oligomer will have the formula

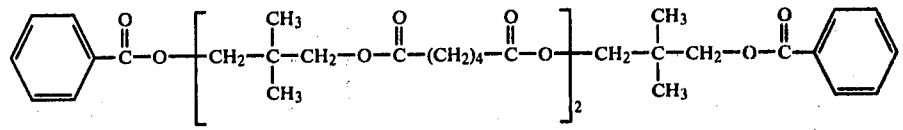

More than one oligomer may be present.

Components (b) i.e., the sodium or potassium salts and (c), i.e., the benzoate oligomer, aid in obtaining molded articles of high surface gloss at molding temperatures well below 110° C. by increasing the rate of crystallization of polyethylene terephthalate. The salts are believed to primarily aid in increasing the rate of crystallization while the oligomer is believed to primarily improve the mobility of the polyethylene terephthalate in its melted state by reducing the viscosity of the polymer mixture. Both are necessary to obtain the high gloss found in the articles molded from the composition. The oligomer is necessary to lower the amount of mold deposits formed.

The amount of salt present is preferably an amount which will result in a $\Delta H_H/\Delta H_c$ ratio of the blend of (a) and (b) less than 0.25. To find $\Delta H_H/\Delta H_c$, polyethylene terephthalate is cold molded into 1/16" thick bars. The bars are heated at a rate of 10° C. per minute and at between 95° C. and 120° C. an exotherm (termed $\Delta H_H$) is recorded on a differential scanning calorimeter (DSC) cell attached to a Du Pont 990 Differential Thermal Analysis (DTA) device. The bar is heated to 290° (which is above its melting point) and the melted sample cooled at 10° C./minute. Another exotherm at between about 200°–225° C. (termed $\Delta H_c$) is the exotherm recorded on freezing of the sample. It has been found that the $\Delta H_H/\Delta H_c$ ratio is a convenient method of measuring the degree of crystallization.

The TpK of the composition is the temperature at which heat evolves most rapidly during the heating cycle recited in the previous paragraph. The amount of the benzoate oligomer present in the composition is preferably an amount which lowers the Tpk of a composition of (a) and (b) by at least 4° C. over that of an identical composition that does not contain the oligomer.

Other Additives

In addition to the components discussed hereinabove, the compositions of this invention may contain additives commonly employed with polyester resins, such as reinforcing agents, fillers, coupling agents, colorants, mold release agents, antioxidants, tougheners, nucleating agents, ultraviolet light and heat stabilizers and the like.

Reinforcing or filler materials are preferably present. Representative ones which may be employed include glass fibers, graphite fibers, aramid fibers, glass beads, aluminum silicate, asbestos, mica, and the like, and combinations of them. The reinforcing or filler material is preferably present in an amount of between 5 and 55 percent by weight of composition.

Preparation

Compositions of this invention can be prepared by blending the components together by any convenient means to obtain a dry blend. Neither temperature nor pressure are critical. For example, the polyethylene terephthalate can be mixed dry in any suitable blender or tumbler with the other components and the dry blend mixture can then be melt-blended, i.e., melt-extruded. The extrudate can be chopped. If desired a reinforcing or filling agent can be added after the first melt extrusion, and the resulting mixture can then be melt extruded.

During melt blending, sodium or potassium ion migration will occur in the melt to some degree. Thus, after melting, the polyethylene terephthalate present will be present to some extent in the form of a sodium or potassium salt, or a mixture of sodium and potassium salts, of polyethylene terephthalate.

EXAMPLE 1

An extrudate was prepared by feeding a dry blend of Composition A (described below) to a 2 inch Sterling single screw extruder. The melt blended extruded strands were cut into pellets and dried overnight prior to molding. The final dried pellets were injection molded into test bars using a 6 oz. Van Dorn reciprocating screw molding machine using a fast ram speed, barrel temperatures of 285° C. and mold temperatures of about 120° C. (except when determining Tpk when 20° C. was used).

| Composition A (% by weight of composition) |
|---|
| 61.6% polyethylene terephthalate of inherent viscosity of 0.6 (Component a) |
| 30.0% glass fiber |
| 3.8% copolymer of ethylene/methacrylic acid (85/15 by weight), 60% neutralized with sodium ions (Component b) |
| 3.9% Benzoate oligomer of the formula (component c) |
| 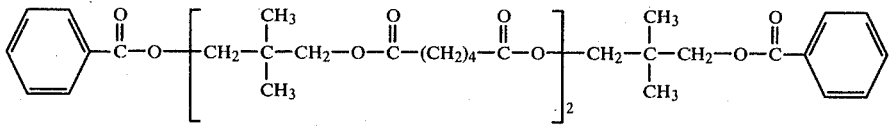 |
| 0.1% tetrabis[methylene(3,5-di-tert-butyl-4-hydroxyhydrocinnamate)]methane (an antioxidant) |
| 0.6% 1009 Epon (a coupling agent for glass fiber) |

Comparison

The following composition was prepared by the procedure described in example 1 (percents are by weight):
61.6% polyethylene terephthalate of inherent viscosity 0.6
30% glass fiber (OCF 3540)
3.8% copolymer of ethylene/methacrylic acid (85/15 by weight), 60% neutralized with sodium ions
3.9% dibenzoate of neopentyl glycol
0.1% tetrabis[methylene(3,5,detert-butyl-4-hydroxyhydrocinnamate)]methane
0.6% 1009 Epon

Property Measurements

Properties were measured using either the extrudate pellets or the injection molded bars as described above. Examples were tested in the dry as molded state without moisture conditioning. The temperature of cold crystallization, Tpk, was obtained by differential scanning calorimetry as described above, and $\Delta H_H/\Delta Hc$ was determined as described above. The volatility was obtained by thermogravimetric analysis (TGA) using the extrudate pellets and/or dry as molded 1/16" test bars. Volatility was determined by finding the intersection of the extrapolation of the base line with the extrapolation of the inflexion on a graph of weight loss versus temperature, at a heating rate of 10° C. per minute. This intersection is defined as the on-set temperature of weight loss, i.e., volatility.

The tensile stress strain properties were obtained on an instron tensile tester.

Properties of the Composition of this Invention

A. The compositions of this invention are less volatile than the comparison.

The decreased volatility is evident in two ways. First visual deposit of material on the mold walls was observed to be less with Composition A than with the Comparison composition. Second, as determined by TGA, the on-set temperature of weight loss for Composition A was 300° C., whereas for the comparison, the on-set temperature was only 180° C.

B. There is minimal ester interchange in the compositions of this invention.

Ester interchange causes the average length of the PET chain to decrease. This in turn decreases the strength of the resin. As measured by tensile strength and unnotched izod, the decrease in values for Composition A over a certain melt time was determined to be minimal and were not as much as would be expected considering the unhindered nature of the benzoate oligomer.

C. That the benzoate oligomer aids in obtaining smooth glossy molded articles at mold temperatures of 80°–100° C., was visually observed.

I claim:

1. A polyethylene terephthalate dry blend consisting essentially of (a) 20–90% by weight of components (a), (b) and (c) of at least one polyethylene terephthalate having an inherent viscosity of at least 0.4 dl/g, as measured by ASTM D-2857, (b) 1–10% by weight of components (a), (b) and (c) of at least one sodium or potassium salt of a hydrocarbon carboxylic acid of 9–25 carbon atoms or at least one sodium or potassium salt of an ionic hydrocarbon copolymer of an α-olefin of 2–5 carbon atoms and an α,β-ethylenically unsaturated carboxylic acid of 3–5 carbon atoms in which the carboxyl groups have been at least partially neutralized with Na+ or K+ cations, provided the amount present is sufficient to provide a $H_H/H_C$ ratio of less than 0.25 to the blend, (c) 0.1–10% by weight of components (a), (b) and (c) of at least one benzoate oligomer of the formula

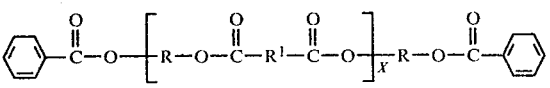

wherein —R— is selected from the class consisting of

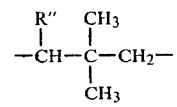

wherein —R″ is H— or alkyl of 1–3 carbon atoms or

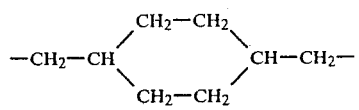

—R¹— is selected from the class consisting of alkylene of 2–6 carbon atoms, arylene or alicyclic alkylene of 6–8 carbon atoms, and X is a cardinal number of between 1 ad 5, provided that the amount present is sufficient to lower the TpK of a blend of (a) and (b) by at least about 4° C.

2. The blend of claim 1 wherein reinforcing or filling material is additionally present in an amount of between about 5 and 55 percent by weight of composition and is glass fiber.

3. The composition of claim 1 wherein component (b) is a sodium or potassium salt of the ionic hydrocarbon copolymer defined in claim 1.

4. The composition of claim 3 wherein the sodium or potassium salt is the salt of a copolymer of an olefin and an acrylic or methacrylic acid.

5. The composition of claim 1 wherein component (c) is at least one benzoate oligomer of the formula

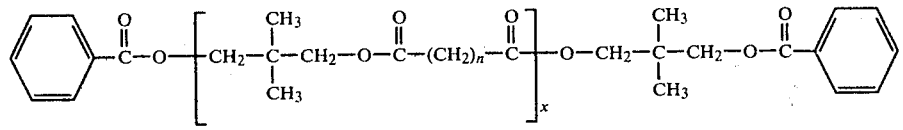

wherein n is a cardinal number of between 2 and 6 and X is a cardinal number of between 1 and 10.

6. The composition of claim 5 wherein n in the formula is 4 and X is 2.

7. A melt blended composition made from the dry blend of claim 1.

8. A melt blended composition made from the dry blend of claim 2.

9. A melt blended composition made from the dry blend of claim 3.

10. A melt blended composition made from the dry blend of claim 4.

11. A melt blended composition made from the dry blend of claim 5.

12. A melt blended composition made from the dry blend of claim 6.

* * * * *